March 10, 1953     I. W. SIMPKINS     2,630,871
CONTROL APPARATUS FOR TANDEM ENGINES
Filed March 1, 1951     3 Sheets-Sheet 1
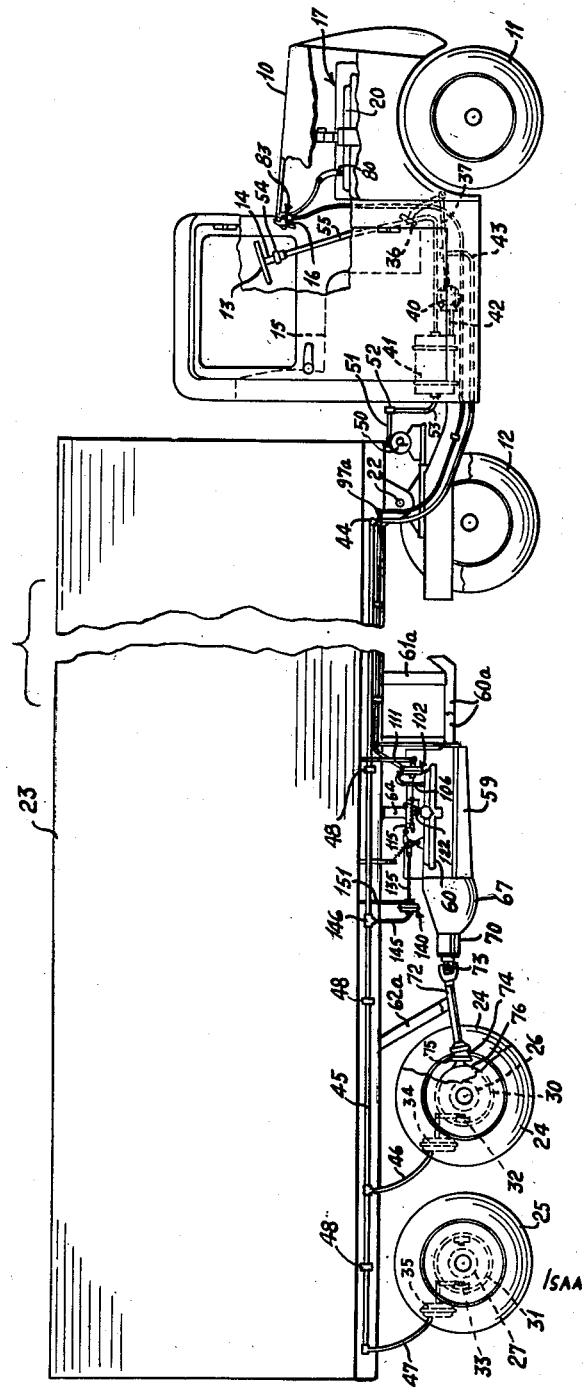
ISAAC W. SIMPKINS,
INVENTOR.
BY Eaton+Bell
ATTORNEYS

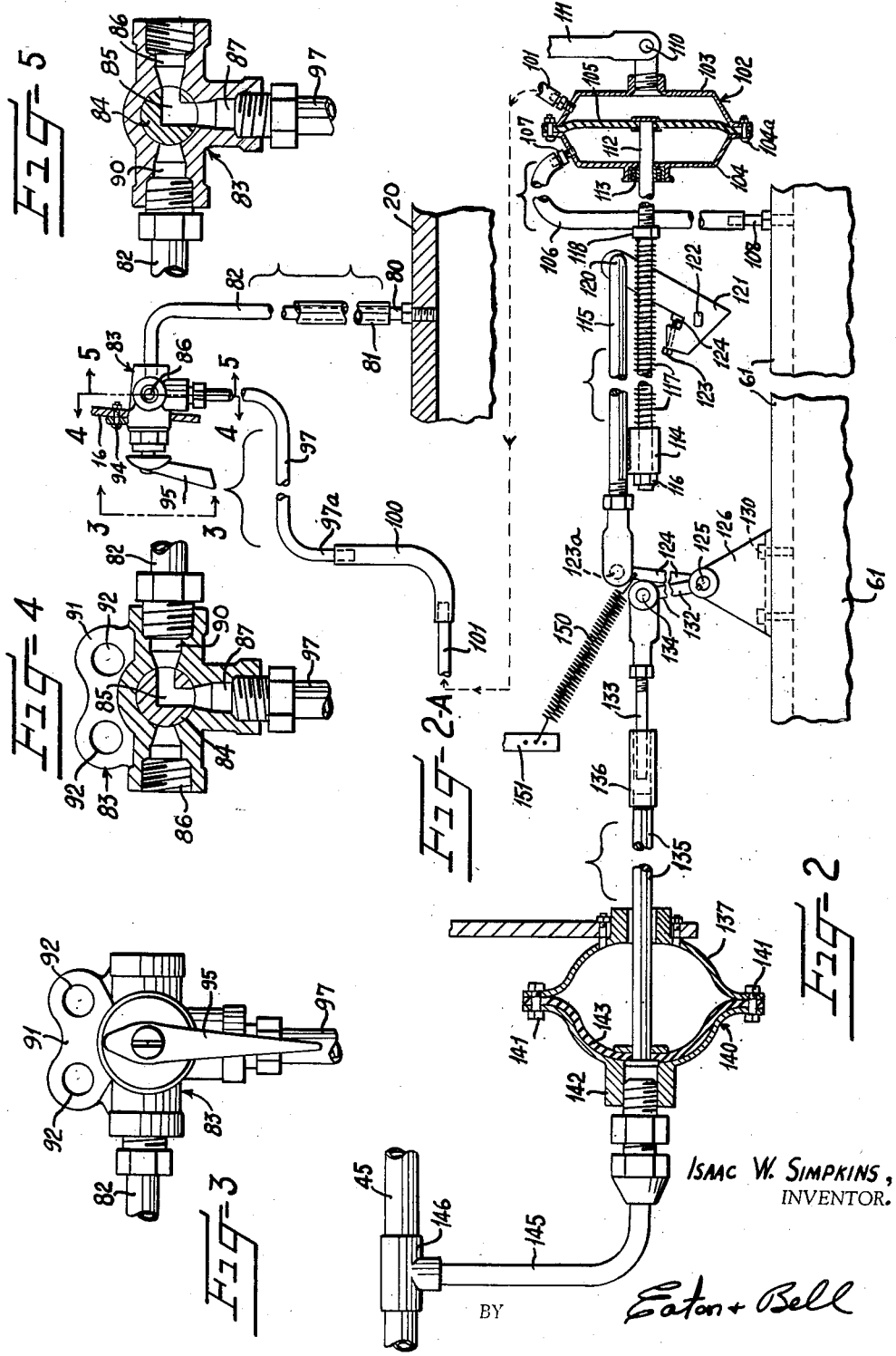

March 10, 1953
I. W. SIMPKINS
2,630,871
CONTROL APPARATUS FOR TANDEM ENGINES
Filed March 1, 1951
3 Sheets-Sheet 3
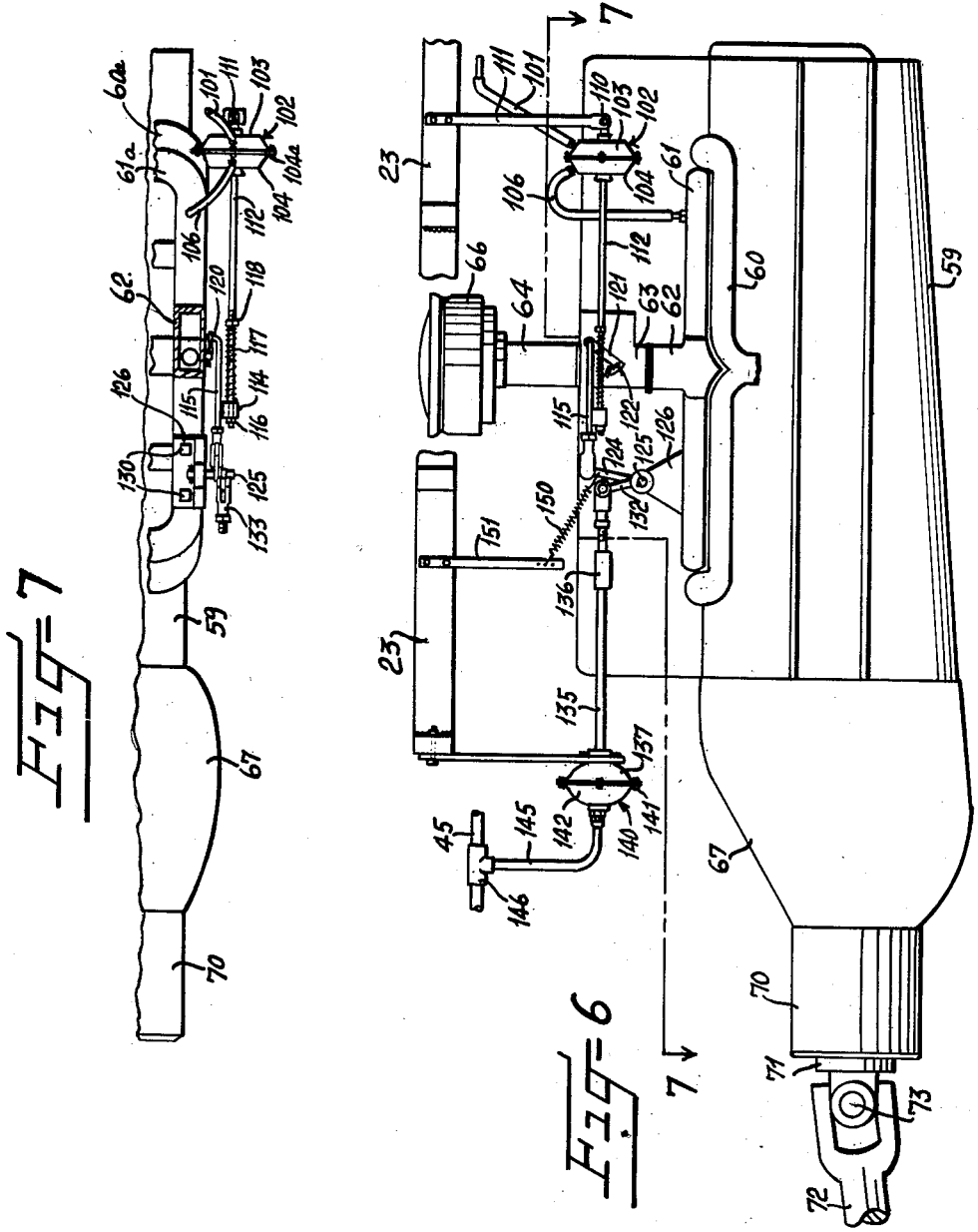
Isaac W. Simpkins,
INVENTOR.
BY Eaton + Bell
ATTORNEYS Patented Mar. 10, 1953

2,630,871

UNITED STATES PATENT OFFICE 2,630,871

CONTROL APPARATUS FOR TANDEM ENGINES

Isaac W. Simpkins, Charlotte, N. C.

Application March 1, 1951, Serial No. 213,401

12 Claims. (Cl. 180—14)

1

This invention relates to an improved apparatus for controlling an internal combustion engine which is auxiliary to the usual engine of a motor vehicle such as may be employed in tractor-trailer combinations and the like.

For purposes of description, it is to be assumed that a second or auxiliary internal combustion engine is associated with a trailer or the like and a first or primary engine is associated with a tractor to the rear end of which the trailer is connected. However, it is to be understood that the auxiliary or secondary internal combustion engine may be suitably connected for driving the rear wheels of the same vehicle having the first or primary internal combustion engine associated therewith.

It is an object of this invention to provide an improved means responsive to variations in manifold pressure in a first internal combustion engine adapted to be associated with a tractor or the like for controlling operation of a second or auxiliary internal combustion engine adapted to be associated with a trailer connected to the rear of the tractor. The control means is so arranged that, upon the occurrence of a relatively low manifold pressure in the first or primary engine, which may occur during a relatively hard pull, the effective power of the auxiliary or second engine will be materially increased and, through a suitable fluid coupling, the auxiliary engine will then transmit motive force to the wheels of the trailer to thereby assist in moving the tractor-trailer combination along a relatively steep up-hill grade or incline.

It is another object of this invention to provide an improved control means for a tractor-trailer combination, wherein the tractor is provided with a first or primary internal combustion engine and the trailer is provided with a second or auxiliary internal combustion engine, this second internal combustion engine being provided with mechanical means connecting the same to the wheels of the trailer. The improved control means include a manually operable valve disposed within reach of the operator of the tractor and having a first suitable conduit connection extending from the same to the first or primary engine. Also, the carbureter of the second or auxiliary engine has a vacuum controlled rod connected thereto which controls the usual butterfly valve in the carbureter of the auxiliary engine, and a second conduit is connected at one end thereof to the manually operable valve and the other end thereof is connected to the said vacuum controlled rod and, assuming the manually controlled valve to

2 be so positioned as to provide communication between the first and second conduits, upon a drop in the manifold pressure of the first engine, this will cause the vacuum controlled rod for the auxiliary engine to move the usual butterfly valve of the carbureter towards fully opened position. The manually controlled valve is also provided with a port through which compressed air in the second conduit may escape to the atmosphere to also cause the throttle of the auxiliary engine to be fully opened although the manifold pressure of the first engine may be sufficient to close the throttle of the auxiliary engine.

It is still another object of this invention to provide means responsive to the extent to which the usual brake applying means for the wheels of the tractor-trailer combination is actuated for varying the position of the usual butterfly valve of the carbureter associated with the auxiliary engine and for closing the throttle associated with the auxiliary engine to thus cause the same to idle upon sudden application of the brakes although the pressure in the manifold of the first or primary engine may be relatively low.

It is still another object of this invention to provide an improved controlled apparatus of the type described wherein the end of the vacuum controlled rod remote from the carbureter is secured to a member mounted for movement inside of a housing, the movable member being so mounted in the housing so as to prevent leakage of air past the opposed sides of the movable member and the second conduit heretofore described being connected to the housing adjacent one side of the movable member and, in addition, a third conduit is provided which is connected at one end thereof to the manifold of the second or auxiliary engine and being connected at its other end to the housing but at a point adjacent the side of the movable member opposite from that adjacent which the second of the conduits is connected.

Thus, since the vacuum controlled rod displaces part of the volume of the area between the movable member connected thereto and the adjacent wall of the housing, and assuming the pressure in the manifolds of both of the engines to be equal, the pressure inside of the housing will be greater at the side of the housing to which the second conduit is connected than it is at the side to which the third conduit is connected thus causing the auxiliary engine to idle while the first or primary engine is pulling the tractor-trailer combination along a substantially level terrain. On the other hand, upon a drop in the manifold pressure of the primary engine, the throttle to the auxiliary engine will be opened until the manifold pressure of the auxiliary engine shall have again built up to where the pressure on opposed sides of the movable member in said housing is equal, at which time, the throttles of both the primary engine and the auxiliary engine will be opened substantially the same amount as will be more fully described later in the specification.

Some of the objects of the invention having been stated, other objects will appear as the description proceeds when taken in connection with the accompanying drawings, in which—

Figure 1 is a side elevation of a typical tractor-trailer combination showing the improved control means for the auxiliary engine and the connections therebetween and the primary engine of the tractor associated therewith;

Figure 2 is an enlarged schematic illustration with parts broken away showing the conduits and mechanical connections associated with the auxiliary engine for controlling the operation of the throttle thereof;

Figure 2-A is an extension of the right-hand end of Figure 2 with parts broken away and showing the conduit connections between the manifold of the first or primary engine of the tractor and the vacuum motor or diaphragm assembly shown in the right-hand portion of Figure 2;

Figure 3 is an enlarged elevation of the manually operated control valve looking substantially along the line 3—3 in Figure 2-A;

Figure 4 is an enlarged vertical sectional view through the manually operated control valve, taken substantially along the line 4—4 in Figure 2-A, and showing the core of the valve in one position;

Figure 5 is an enlarged vertical sectional view similar to Figure 4, taken substantially along the line 5—5 in Figure 2-A, but showing the core of the valve in another position;

Figure 6 is an enlarged side elevation of the auxiliary or tractor internal combustion engine shown in the central portion of Figure 1 and showing the various connections associated with the throttle which respond to variations in manifold pressure of the primary engine, associated with the tractor, for opening and closing a throttle and also showing connections between the throttle control mechanism and the brake operating mechanisms;

Figure 7 is a fragmentary top plan view showing one side of the auxiliary internal combustion engine and looking down substantially along the line 7—7 in Figure 6.

Referring more specifically to the drawings, the numeral 10 indicates a tractor having front wheels 11 and rear wheels 12. The front wheels are operated in a conventional manner through suitable intervening connections, not shown, by means of a steering wheel 13 which is mounted on the upper end of a steering column 14. A suitable seat 15 is provided rearwardly of the steering column 14 for the operator of the vehicle.

Disposed forwardly of the steering column 14 is a conventional instrument panel 16 on which the usual instruments are provided for controlling an internal combustion tractor or primary engine generally designated at 17 and which is provided with the usual manifold 20 in which a vacuum or negative pressure is created during normal operation of the engine 17, as is well known to those familiar with the art, and in which the negative pressure may be substantially reduced upon sudden acceleration of the engine 17 or upon the engine being placed under a relatively hard pull, such as upon initially starting movement of the tractor or in moving up a relatively steep grade or incline.

The rear portion of the tractor 10 has pivotally connected thereto, as at 22, the foremost end of a trailer 23. This trailer can be of any desired length and has its trailing or rear end portion supported by wheels 24 and 25 which are mounted on suitable axles 26 and 27, respectively. These axles 26 and 27 are usually connected to the bottom of the trailer 23 by suitable leaf springs which have been omitted from the showing in Figure 1 for purposes of clarity since this structure is well known to those familiar with the art.

The wheels 24 and 25 are provided with suitable brake drums 30 and 31, respectively, which are adapted to be engaged by suitable brake bands 32 and 33, respectively. These brake bands 32 and 33 are controlled as to movement relative to the respective brake drums 30 and 31 by conventional diaphragm assemblies or motors 34 and 35, respectively, and through suitable intervening connections.

The tractor 10 has a suitable brake pedal 36 therein to the lower end of which the lower end of a valve control rod or link 37 is pivotally connected, the other end of this rod or link 37 being suitably connected to a conventional valve 40 for controlling the flow of compressed air from a pressure tank 41 through a pipe or conduit 42 and through the valve 40 to a pipe or conduit 43. The pipe or conduit 43 is detachably coupled, as at 44, to a pipe or conduit 45 suitably secured to the chassis of the trailer 23 as by clips 48. This pipe 45 has a pair of flexible pipes 46 and 47 connected thereto which extend downwardly in Figure 1 and are connected to the respective diaphragm assemblies or motors 34 and 35, these diaphragm motors 34 and 35 being substantially the same as those shown in Figure 2 of my Patent No. 2,235,175 of March 18, 1941.

Pressure is maintained in the pressure tank 41 of the tractor 10 by a suitable compressor 50 supported on the chassis of the tractor 10 and which has a pipe 51 extending therefrom to a suitable check valve 52 from whence a pipe 53 extends to the pressure tank 41. A suitable pressure gauge 54 is mounted on the steering column 14 adjacent the steering wheel 13 and has a pipe 55 extending therefrom to the pressure tank 41 and this pressure gauge 54 is provided to indicate to the operator the pressure in the tank 41.

A suitable auxiliary or secondary internal combustion engine 59 is suspended from the bottom of the trailer 23 by a suitable framework comprising horizontally disposed frame members 60a which are connected to upwardly extending frame members 61a and 62a being suitably secured at their upper ends to the lower portion of the trailer 23. Enlarged views of the auxiliary internal combustion engine 59 may be observed in Figures 6 and 7.

The internal combustion engine 59 is of usual construction and has an exhaust manifold 60 and an intake manifold 61, the intake manifold having an upwardly projecting tubular portion 62 thereon which supports the lower end of a carbureter 63 having an extended tubular upper portion 64 integral therewith. This upper portion 64 has the usual automatic choke therein, not shown.

A suitable air cleaner 66 is disposed above the portion 64 of the carbureter 63.

The particular type of internal combustion engine 59 shown includes an automatic transmission, the housing of which is indicated at 67, and since the structure thereof is not pertinent to the present invention, a description thereof is deemed unnecessary. It is preferred that a transmission of the type shown in McFarland Patent No. 2,324,713 of July 20, 1943, be employed.

A suitable fluid coupling mechanism disposed within a housing 70 is disposed rearwardly of the automatic transmission housing 57 and is provided for transmitting motive force from the transmission to a shaft 71 to which the front end of a drive shaft 72 is universally connected as at 73.

Referring to Figure 1, it will be observed that the rear end of the drive shaft 72 is universally connected as at 74, to the front end of a second drive shaft 75 projecting from a differential gearing housing 76. The differential gearing housing contains the usual differential gearing for transmitting motive force from the drive shaft 72 to the wheels 24 in a well known manner.

The parts heretofore described are conventional parts of a tractor-trailer combination wherein an auxiliary internal combustion engine is employed for driving the wheels of the trailer and it is with these parts that the present invention is adapted to be associated.

Referring to Figures 1 and 2, it will be observed that the intake manifold 20 has a suitable nipple or conduit 80 connected thereto to the upper end of which a flexible tube 81 is connected, the other end of the flexible tube 81 being connected to a pipe 82. This pipe 82 extends upwardly and is connected to a port 90 of a three-position manually operable valve broadly designated at 83. This valve 83 is of a type having a manually rotatable core 84 therein which is provided with a passageway 85 for providing communication between ports 90 and 87 in the housing of the valve 83 or between the port 87 and a port 86 in the housing of the valve 83. The housing of the valve 83 has a suitable flange 91 thereon provided with bores 92 which are adapted to be slidably penetrated by bolts 94 for securing the valve housing 83 to the instrument panel 16 of the tractor 10. It will be observed in Figures 1 and 2-A that the valve 83 extends through the instrument panel.

The core 84 of the manually operable valve 83 has a suitable handle 95 on the outer end thereof which is disposed rearwardly of the housing of the valve 83 and is adapted to be manipulated by an operator as desired for purposes to be later described.

The pipe 82 is connected to the valve 83 for communication with the port 90, as shown in Figures 3, 4 and 5, and there is connected to the housing of the valve 83, the upper end of a pipe or conduit 97 which communicates with the port 87 in the housing of the valve 83. This pipe or conduit 97 extends downwardly and rearwardly, as shown in Figure 1, and is detachably connected to a pipe or conduit 97a which, in turn, is connected to one end of a flexible tube 100. The other end of the flexible tube 100 is connected to a rearwardly extending pipe or conduit 101 which is connected at its rear end for communication with the interior of a housing of a diaphragm assembly or a vacuum motor broadly designated at 102.

The diaphragm assembly comprises concavo-convex members 103 and 104 suitably secured together, as by bolts 104a, which also serve to secure the rim of a suitable flexible or pliable diaphragm member 105 between the members 103 and 104. It will be most clearly observed in Figure 2 that the conduit 101 is connected for communication with the member 103 adjacent one side of the flexible diaphragm member 105 while the member 104 of the diaphragm assembly has one end of a flexible pipe or conduit 106 connected thereto as by a nipple or adapter 107 for communication therewith adjacent the opposite side of the flexible diaphragm member 105 from that adjacent which the pipe or conduit 101 is connected. This pipe 106 extends from the diaphragm assembly 102 and is suitably connected, as by a nipple or adapter 108, to the intake manifold 61 of the auxiliary internal combustion engine 59 for communication therewith.

The diaphragm assembly 102 is pivotally connected, as at 110, to the lower end of a support arm 111 which extends upwardly in Figures 1 and 2 and is suitably secured to the lower portion of the trailer 23 so as to support the diaphragm assembly 102 for pivotal movement. The flexible diaphragm member 105 in the diaphragm assembly 102 has the front end of a connecting rod or link 112 suitably secured thereto which slidably penetrates a packing gland 113 in the member 104 of the diaphragm assembly 102. A suitably sealing ring resiliently encircles the rod 112 and is fixedly mounted in the member 104 of the diaphragm assembly 102 to thus prevent passage of air between the interior of the diaphragm assembly 102 and the exterior thereof.

Referring to Figure 2, the rear portion of the rod 112 slidably penetrates a projection 114, on a thrust rod or second connecting rod 115, which may be integral with the rod 115 but is shown in Figure 2 as being welded thereto. The rear end of the first connecting rod 112 extends substantially beyond the projection 114 and has a suitable collar 116 fixedly mounted thereon, against which the projection 114 on the second connecting rod 115 is normally urged by a compression spring 117. The compression spring 117 encircles the medial portion of the connecting rod 112 and its rear end bears against the projection 114 and the front end thereof bears against an adjustment nut 118 which is threadably mounted on the rod 112.

The projection 114 is disposed intermediate the ends of the second connecting rod or thrust rod 115 and the front end of the thrust rod 115 is pivotally connected, as at 120, to a throttle operating or idler control lever 121 which is oscillatably mounted, as at 122, on the carbureter jacket 63, this point 122 also being the point at which the usual butterfly valve, not shown, is connected to the throttle idler control lever 121.

The throttle idler control lever 121 is threadably penetrated by a suitable throttle adjustment screw 123, disposed between the pivot point 122 and the point 120 at which the thrust rod 115 is connected to the throttle idler control lever 121, and which is adapted to, at times, engage a projection or stop 124 extending from the carbureter jacket 63 (Figure 2). The adjustment screw 123 is provided for the well known purpose of determining the speed of the auxiliary internal combustion engine 59 while it is idling.

It will be observed in Figures 2, 6 and 7 that the second connecting rod or thrust rod 115 extends rearwardly beyond the projection 114 and is pivotally connected, as at 123a, to the upper end of an arm 124 which extends downwardly and is keyed on a stub shaft 125. The stub shaft 125 extends inwardly and is oscillatably mounted in the upper end of a bracket 126 (Figures 2, 6 and 7) which is suitably secured, as by screws 130, to the upper surface of the intake manifold 61. Also, keyed on the stub shaft 125, is the lower end of an arm 132, to the upper end of which the front end of a third connecting rod 133 is pivotally connected, as at 134.

The connecting rod 133 extends rearwardly, in Figures 2 and 6, and is telescopically connected to the front end of a plunger or rod 135 by means of a tubular member of sleeve 136 which is suitably secured, as by welding, to the front end of a rod 135 and this tubular member being slidably penetrated by the rear portion of the connecting rod 133.

The plunger or rod 135 extends rearwardly and loosely penetrates the front end of the concavo-convex member 137 of a diaphragm assembly or housing designated broadly at 140. The concavo-convex member 137 is suitably secured, as by bolts 141, to a similar member 142 and these bolts 141 also serve to secure the rim of a flexible diaphragm member 143 between the members 137 and 142 of the diaphragm assembly or housing 140. The inner end of the diaphragm plunger 135 is suitably secured to the flexible diaphragm 143.

Although, diaphragm assemblies 102 and 140 are provided, it is to be understood that a suitable cylinder may be employed in lieu of each of the pairs of concavo-convex members 103 and 104 and 137 and 140 and suitable pistons may be mounted for longitudinal sliding movement in the corresponding cylinders in lieu of the flexible diaphragms 105 and 143. As a matter of fact, both cylinder and piston assemblies and diaphragm assemblies of the type shown have been found to operate equally as well in association with the improved control mechanism for the auxiliary engine. The diaphragm assemblies 102 and 104 may broadly be termed as closed housings while the flexible diaphragms 105 and 143 may be termed as movable members.

Now, a pipe or conduit 145 is connected to the rear end of the member 142 of the diaphragm assembly 140 for communication with the interior of the diaphragm assembly 140 and the end of the pipe 145 remote from the diaphragm assembly or housing 140 is connected to the pipe or conduit 45, heretofore described, by means of a pipe T 146.

A tension spring 150 is connected at one end thereof to the arm 124, or may be connected to the rod 115, and the other end thereof is connected to an arm 151 depending from the bottom of the trailer 23. It is evident that the connecting rod or link 112 may also be termed as a throttle operating or control rod, a movable throttle control element or a vacuum responsive throttle control member.

*Method of operation*

It is to be understood that suitable independently operable control means are provided in the tractor 10 for manipulation by an operator for starting the internal combustion engines 17 and 59, such connections being omitted from the drawings since their structure is well known to those familiar with the art and these connections do not constitute a part of the present invention.

It is first to be assumed that the trailer 23 is empty and, therefore, it is evident that the auxiliary engine 59 would not be required to assist in propelling the vehicle and, as a matter of fact, the auxiliary engine 59 would not have to be started. Thus, upon starting the tractor engine 17, the valve core 84 would be positioned as shown in Figure 5 and would permit atmosphere to enter through the port 86 and the pipes 97, 100 and 101 to the portion 103 of the diaphragm valve or assembly 102. Thus, the diaphragm member 105 would be permitted to move to the left as the tension spring 150 moves the throttle idler control lever 121 in a counter-clockwise direction in Figure 2 and, in which event, the throttle would assume an open position. However, since the auxiliary engine 59 is not in operation, this will not affect the engine 59.

However, after loading the trailer 23, the operator may start the auxiliary engine 59 at which time he will rotate the core 84 of the manually operable valve 83 to the position shown in Figure 4 and while the tractor-trailer combination is at a standstill, the vacuum pressure in the intake manifold 20 will be such that it will cause the diaphragm member 105 in Figure 2 to move from left to right due to the vacuum pressure being transmitted through the nipple 80 and pipes 81 and 82 to the port 90 of the manually operable valve 83. Negative pressure will then be transmitted to the diaphragm assembly 102 in Figures 2 and 6 from the port 90 (Figure 4), through the passageway 85, through the port 87 and through the pipes 97, 100 and 101 to the diaphragm assembly 102.

Now, although the auxiliary engine 59 is operating at this time, the auxiliary engine 59 will continue to idle while the primary engine 17 idles due to the volume of the area between the member 103 and the diaphragm member 105 of the diaphragm assembly 102 being greater than the area between the diaphragm member 105 and the member 104 as heretofore described. Therefore, the rod 112 is caused to assume the previous position adjacent the member 103 in the diaphragm assembly 102 resulting in the auxiliary engine 59 idling while the primary engine 17 is idling.

Upon acceleration of the engine 17, the negative pressure in the intake manifold 20 of the tractor engine 17 will be substantially reduced and, thus, the negative pressure on the left-hand side of the flexible diaphragm member 105 in Figure 2 will be substantially greater than the negative pressure on the right-hand side of the flexible diaphragm member 105. This will, of course, cause the central portion of the diaphragm member 105 and the corresponding rod 112 to tend to move from right to left and the compression spring 117 and the tension spring 150 will both urge the throttle idler control lever 121 in a counter-clockwise direction in Figure 2 to open the throttle, in which position it will remain until the vacuum pressures in the manifolds 20 and 61 of the respective engines 17 and 59 are substantially equal.

It is to be understood that the flexible diaphragm member 105 in the diaphragm assembly 102 is caused to move back and forth in accordance with variations in the vacuum pressures in the manifolds 20 and 61 of the respective engines 17 and 59. This occurs regardless of the effective horsepower output of the two engines since the movement of the diaphragm member 105 in opposite directions is proportionate to the ratio between the effective horsepower output of the respective engines and their respective manifold pressures.

It follows that in the event of the primary or tractor engine 17 being an eighty or even ten horsepower engine and the auxiliary or trailer engine 59 being a one-hundred fifty horsepower engine, for example, the vacuum pressure in the respective manifolds 20 and 61 would be equal at various speeds although the load on the respective engines would vary in accordance with the horsepower of the respective engines. Thus, the primary engine, having eighty horsepower, for example, would not be required to expend a greater proportion of its power than that of the auxiliary engine when the manifold pressures in the two engines are equal.

For example, when the tractor-trailer combination is moving along a relatively shallow up-hill grade or incline, it may require the entire output in horsepower of the primary or tractor engine 17 in order to move the tractor-trailer combination along this shallow up-hill grade or incline in the event that the auxiliary engine 59 is not employed. However, when the auxiliary engine is employed and arranged in the manner last described, with the valve core 84 in the position shown in Figure 4, the load would be proportionately distributed between the two engines 17 and 59 and, assuming that it requires 50% of the horsepower of the tractor engine 17, which would be forty horsepower, to move the tractor-trailer combination along the up-hill grade, the output of the auxiliary or trailer engine would also be 50% of its effective horsepower or, for example, seventy-five horsepower and so on.

In order to fully clarify this point, it is to be assumed that the tractor-trailer combination is moving along a level terrain at a relatively slow speed and the operator suddenly accelerates the primary engine to a slightly greater speed than it had previously been operating. Immediately, there is a slight drop in the pressure in the intake manifold 20 of the tractor engine 17, resulting in a drop in the negative pressure at the right-hand side of the flexible diaphragm member 105 in Figure 2. The negative pressure in the manifold 61 of the auxiliary engine 59 is then momentarily greater than that in the intake manifold 20 of the tractor engine 17 and, therefore, the negative pressure on the left-hand side of the flexible diaphragm member 105 would be greater than that on the right-hand side thereof in Figure 2.

This results in the diaphragm member 105 immediately moving from right to left a slight amount until the auxiliary engine has been accelerated proportionate to the acceleration of the primary or tractor engine 17. At this point, the vacuum pressure on opposed sides of the flexible diaphragm member 105 would again be equal and the throttle of the auxiliary engine would remain open substantially the same amount, proportionately, as the throttle of the primary engine 17.

On the other hand, upon the operator suddenly closing or decelerating the throttle of the primary or tractor engine 17, the load would be transmitted to the rear or auxiliary engine 59 resulting in a sudden drop in the negative pressure in the intake manifold 61 of the auxiliary engine 59. The flexible diaphragm member 105 then tends to move from left to right in Figure 2 to close the throttle of the auxiliary engine in accordance with the position of the throttle in the primary engine 17.

As is well known to those familiar with the art, the insurance underwriters and the laws of the various States require that certain standards of safety be strictly adhered to by the operators of commercial vehicles such as tractor-trailer combinations. However, heretofore, in order for a tractor-trailer combination to propel itself up a relatively steep grade or incline, it has been necessary for the tractor-trailer to exceed the usual speed limits recommended for these types of vehicles in moving along a substantially level or down-hill grade or incline in order to depend upon its momentum to assist in moving the vehicle along a succeeding relatively long up-hill grade or incline. This not only placed the primary engine under a relatively hard pull as it moved along the up-hill grade but also caused the engine to consume an excessive amount of fuel.

However, by the use of the present invention herein described, it is evident that the tractor-trailer combination would not have to build up an excessive speed in order to move along a relatively long and steep up-hill grade or incline since, as the throttle of the primary or tractor engine 17 is opened progressively by the operator, the throttle of the auxiliary or trailer engine 59 is opened proportionately and the pull of the two engines is proportionate to the horsepower of the two engines thus insuring that the tractor-trailer combination may move along a relatively long up-hill grade at a normal rate of speed.

Now, as the tractor-trailer combination moves along a relatively steep down-hill grade or incline or along a substantially level terrain, it is evident that the core 84 of the valve 83 could be rotated 90 degrees in a counter-clockwise direction in Figure 5 to close ports 87 and 90 so as to permit the rear or auxiliary engine 59 to idle as the entire load is pulled by the motive force of the primary or tractor engine 17.

On the other hand, if the operator desired to cause the throttle of the auxiliary engine 59 to remain partially or fully opened in any position in which it was caused to assume by the variations in the manifold pressures of the two engines 17 and 59, it is evident that the core 84 of the manually operable valve 83 would be positioned in the same manner as described in the preceding paragraph. In this instance, it is evident that the vacuum pressure on opposed sides of the flexible diaphragm member 105 would remain constant and this would cause the throttle idler control lever 121 to remain in a fixed position until the core 84 of the valve 83 was again rotated to one or the other of the positions shown in Figures 4 and 5.

Now, in the interests of safety and to also facilitate manual control of the throttle of the auxiliary engine 59, the diaphragm assembly 140 is provided for controlling the position of the throttle idler control lever 121 responsive to actuation of the brake pedal 36 (Figure 1).

It is evident that, due to the telescopic arrangement formed by the tubular member 136 at the juncture of the rods 135 and 133, the rod 133 may move back and forth independently of the rod 135 in accordance with the variations in the position of the throttle idler control lever 121. However, regardless of the speed at which the tractor-trailer combination may be moving along the terrain, it may be necessary to suddenly apply the brakes of the vehicle, in which instance, it is necessary that the throttle of the auxiliary engine be closed immediately regardless of the position of the core 84 in the manually operable valve 83 and regardless of any variations in the manifold pressures of the two engines 17 and 59.

Therefore, upon depressing the brake pedal 36, compressed air will flow from the pressure tank 41, through the pipe 42, valve 40, pipes 43, 45, 46 and 47 to actuate the usual brake mechanisms and the pressure will then also simultaneously flow through the pipe 145 to the diaphragm assembly 140 to thus cause the diaphragm 143 to move from left to right in Figure 2 to thereby move the throttle control rod 135 in a like direction until the free end thereof engages the corresponding end of the rod 133. Movement will then be imparted to the rod 136 from left to right in Figure 2 and this will cause like movement to be imparted to the rod 115 and to thus move the throttle idler control lever 121 in a clockwise direction to a closed position. The rod 115 is permitted to override the rod 112 because the rod 112 in the right-hand portion of Figure 2 may remain stationary as the projection 114 on the rod 115 moves along the rod 112 and against the compressions spring 117, it being understood that the pressure in the tank 41, and which is transmitted to the diaphragm assembly 140, is substantially greater than the pressure exerted by the compression spring 117 and the tension spring 150.

If it so happens that the primary or tractor engine 17 is not operating satisfactorily, the operator may propel the vehicle entirely by the motive force of the auxiliary engine 59 merely by suddenly moving the throttle of the primary or tractor engine 17 to fully opened position, which would, of course, cause the throttle idler control lever 121 to suddenly move to opened position. The operator would then, immediately thereafter, move the core 84 of the manually operable valve 83 to where it would close the port 87 and this would cause the throttle of the auxiliary engine 59 to remain in fully opened position until the brakes were applied.

However, the operator of the vehicle could then vary the pressure applied to the brake pedal 36 or a suitably manually operable valve, such as is shown in my Patent No. 2,235,175, may be provided in conjunction with the brake pedal 36 so as to regulate the flow of compressed air from the tank 41 to the diaphragm assembly 140. Since the rear end of the rod 133 in Figure 2 would be in engagement with the front end of the rod 135 or in closed proximity thereto, when the diaphragm member 143 is in the position shown in Figure 2 and when the throttle idler control lever 121 is in fully opened position, any variations in the position of the central portion of the flexible diaphragm member 143 in the diaphragm assembly 140 would be transmitted to the throttle idler control lever 121 and, through this medium, the operation of the pedal 36 could control the position of the throttle idler control lever 121 on the auxiliary engine 59. The slight movement of the brake pedal 36 necessary to control the operation of the throttle associated with the auxiliary engine 59 in the manner heretofore described would not be sufficient to effect operation of the usual brake mechanisms associated with the rear wheels 24 and 25.

As heretofore stated, it is to be assumed that the present invention is associated with an auxiliary engine having an automatic transmission with a fluid coupling therebetween and the drive shaft 72. However, some vehicles have a suitable clutch mechanism disposed within the housing 70 rearwardly of the automatic transmission which must be engaged and disengaged for controlling the transmission of motive force from the transmission to the first drive shaft 72 and it is evident that a suitable linkage could be arranged which could be connected at one end thereof to the shaft 125 (Figure 2) and at the other end thereof to a suitable arm for controlling the clutch mechanism so as to operate the clutch mechanism in accordance with the operation of the auxiliary engine 59. Since such control means for a clutch mechanism associated with an auxiliary engine is covered by other patents, such as my Patent No. 2,235,175 of March 18, 1941, and is not necessary to the operation of the present invention, an illustration and description thereof have been omitted from this specification.

It is thus seen that I have provided an extremely simplified means for controlling the auxiliary internal combustion engine 59 under influene of the manifold pressure in the tractor engine and wherein a manually operable valve means is provided for placing in effect the motive force of the auxiliary engine independently of the manifold pressure of the tractor engine for assisting the tractor engine in adverse conditions although the pressure in the intake manifold 20 may be relatively high.

It is to be understood that although the engines 17 and 59 are shown in association with the tractor 19 and the trailer 23, respectively, there may be instances in which both of the engines are mounted on a common vehicle provided with two sets of wheels and wherein the auxiliary engine 59 would also be operated and the various parts of the present invention would also be arranged in substantially the same manner as that described for a tractor-trailer combination. Also, there may be instances in which the motive force of both the engines 17 and 59 may be transmitted to a common set of wheels all of which is well known to those familiar with the art and a description or showing of the same is deemed unnecessary.

It is evident that the present invention may be used in association with a plurality of internal combustion engines such as may be used for driving compressors or dynamos and the like in large industrial plants. In other words, a substantially greater number of engines may be caused to operate in synchronism wherein a plurality of auxiliary engines could all be operated in response to a single primary engine to cause a particular load to be evenly distributed throughout all of the engines and wherein the various auxiliary engines are connected to the primary engine in parallel or the primary engine could be connected to a single one of the auxiliary engines and any additional auxiliary engines could be arranged in series substantially as shown in the drawings, because it is evident that upon a drop in the manifold pressure of the primary engine or any of the other engines, any engines connected thereto in series in the manner shown in the drawings, would also respond accordingly.

In the drawings and specification, there has been set forth a preferred embodiment of the invention and although specific terms are employed, they are used in a generic and descriptive sense only and not for purposes of limitation.

the scope of the invention being defined in the claims.

I claim:

1. An improvement in a tractor and trailer apparatus having the following conventional features: a tractor engine, a trailer engine, each engine being provided with an intake manifold and throttles for controlling the flow of fuel to the engines, means controlled by the manifold pressure in the tractor engine for regulating the position of the throttle for the trailer engine, the trailer having fluid pressure actuated brakes and a fluid pressure line connected to the brakes of the trailer, said tractor having a brake pedal, a connection between the brake pedal and the fluid pressure system for admitting fluid pressure to the fluid pressure line upon application of brakes, said improvement comprising a resilient and extensible means connected to the throttle lever of the trailer engine, tension means normally tending to pull the throttle of the trailer engine to open position, a telescopic rod connected to the resilient and extensible means for controlling the position of the throttle of the trailer engine, fluid pressure operated means connected to said telescopic rod and to the fluid pressure line for closing the throttle to the trailer engine upon full application of brakes, and for controlling the position of the throttle of the trailer engine by admission of less pressure than that sufficient to apply the brakes of the trailer.

2. In a tractor and trailer apparatus having the following conventional features: a tractor engine, a trailer engine, each engine being provided with an intake manifold and a throttle for controlling the flow of fuel to the engines, means controlled by the manifold pressure in the tractor engine for regulating the position of the throttle for the trailer engine comprising a chamber having a movable member therein dividing the chamber into first and second compartments, a piped connection between the intake manifold of the tractor engine and the first compartment, a piped connection between the second compartment and the intake manifold of the trailer engine, the trailer having fluid pressure actuated brakes and a fluid pressure line connected to the brakes of the trailer and said tractor having a brake pedal, a connection between the brake pedal and the fluid pressure system for admitting fluid pressure to the fluid pressure line upon movement of the brake pedal, the combination of a first rod connected at one end to the throttle lever of the trailer engine, a second rod having one end slidably supported by the first rod, the second rod having its other end connected to the movable means in said chamber, resilient means tending to move the two rods relative to each other to extend the over-all length of the first and second rods, tension means normally tending to move the throttle of the trailer engine towards open position, a telescopic rod connected to the first rod for controlling the position of the throttle of the trailer engine, fluid pressure operated means connected to said telescopic rod and to the fluid pressure line for closing the throttle to the trailer engine upon full application of brakes, and for holding the throttle of the trailer engine in a partially opened position by admission of less pressure to the fluid pressure line than that sufficient to apply the brakes of the trailer.

3. In a tractor and trailer apparatus, said tractor having an engine provided with an intake manifold and said trailer having an auxiliary engine also provided with an intake manifold, and also having a pressure responsive chamber divided into two sections by a movable member with a piped connection between one section and the intake manifold of the tractor engine and a second connection between the other section of said chamber and the intake manifold of the trailer engine, said tractor also having a source of fluid under pressure and a fluid line leading to the trailer and said trailer having fluid actuated brakes connected to said fluid line and said tractor also having a connection between the brake pedal thereof and the fluid pressure line for admitting fluid under pressure into the fluid pressure line when the brake pedal is actuated toward brake applying position, the movable member in the chamber being responsive to the negative pressures developed on each side of the movable member by the intake manifolds of the engines, the combination of a first rod connected to said movable member, a second rod parallel to the first rod and a sliding connection between the two rods, spring means normally tending to move the two rods apart from each other longitudinally of their axes, the second rod being connected to the throttle of the trailer engine, spring means connected to the second rod and tending to move the throttle of the trailer engine to open position, a third rod connected to the second rod and having a telescopic portion therein, and means connected to the third rod and to the fluid pressure line whereby the third rod can be operated by admission of small amounts of fluid into the fluid pressure line which is connected to the brakes to control the throttle to the auxiliary engine when the tractor engine becomes inoperable.

4. An improvement in a tractor and trailer apparatus, said tractor having an engine provided with an intake manifold and said trailer having an engine also provided with an intake manifold, and also having a pressure responsive chamber divided into two sections by a movable member with a piped connection between one section and the intake manifold of the tractor engine and a second connection between the other section of said chamber and the intake manifold of the trailer engine, said tractor also having a source of fluid under pressure and a fluid line leading to the trailer and said trailer having fluid actuated brakes connected to said fluid line and said tractor also having a connection between the brake pedal thereof and the fluid pressure line for admitting fluid under pressure into the fluid pressure line when the brake pedal is actuated toward brake applying position, the movable member in the chamber being responsive to the negative pressures developed on each side of the movable member by the intake manifolds of the engines, said improvement comprising a first rod connected to said movable member, a second rod parallel to the first rod and a sliding connection between the two rods, spring means normally tending to move the two rods apart from each other longitudinally of their axes, the second rod being connected at one end to the throttle of the trailer engine, spring means connected to the second rod and tending to move the throttle of the trailer engine to open position, a third rod connected to the second rod and having a telescopic portion therein, and means connected to the third rod and to the fluid pressure line whereby the third rod can be operated by admission of small amounts of fluid into the fluid pressure line to control the throttle to the trailer engine when the tractor engine becomes inoperable.

5. In a tractor and trailer apparatus, said tractor having an engine provided with an intake manifold and said trailer having an engine also provided with an intake manifold, and also having a pressure responsive chamber divided into two sections by a movable member with a piped connection between one section and the intake manifold of the tractor engine and a second connection between the other section of said chamber and the intake manifold of the trailer engine, said tractor also having a source of fluid under pressure and a fluid line leading to the trailer and said trailer having fluid actuated brakes connected to said fluid line and said tractor also having a connection between the brake pedal thereof and the fluid pressure line for admitting fluid under pressure into the fluid pressure line when the brake pedal is actuated toward brake applying position, the combination of a rod connected to said movable member and to the throttle of the trailer engine, spring means tending to move the throttle of the trailer engine to open position, a telescopic rod connected to the throttle of the trailer engine and means connected to the telescopic rod and to the fluid pressure line whereby the throttle of the trailer engine can be operated by admission of small amounts of fluid into the fluid pressure line to control the throttle to the trailer engine when the tractor engine becomes inoperable.

6. An improvement in a tractor and trailer wherein said tractor and trailer are provided with a tractor engine and a trailer engine and a piped connection between the manifolds of the tractor engine and the trailer engine with a chamber disposed in said piped connection and having a movable member therein dividing the chamber into first and second compartments and having a rod extending rearwardly from said movable member and said trailer having fluid brakes and a fluid connection leading from the tractor to the brakes of the trailer and means operable by the brake pedal of the tractor for admitting fluid under pressure into the fluid pressure line leading to the brakes of the trailer and said trailer engine having a throttle arm, said improvement comprising a throttle arm rod connected at one end to the throttle arm of the trailer engine and extending rearwardly and having a projection thereon provided with a bore in which the rod extending from the movable member in said chamber has sliding movement, a compression spring disposed on the rod extending from the movable member in said chamber and abutting against the projection on the rod connected to the throttle arm of the trailer engine, spring means tending to move the throttle arm rearwardly at all times towards open position, a telescopic rod connected to the throttle arm rod, fluid operated means connected to the telescopic rod and a piped connection between the fluid operated means and the fluid pressure line whereby, fluid pressure in the tractor engine will control the position of the throttle arm to the trailer engine, and upon complete failure of the tractor engine, fluid pressure may be admitted to the fluid pressure line below the point at which brakes will be applied to the trailer brakes to thereby shorten said telescopic rod and move the throttle of the trailer engine toward closed position and upon a relaxation of pressure in the fluid pressure line, the spring means will tend to return the throttle of the trailer engine toward open position and upon admission of brake applying pressure to the fluid pressure line the telescopic rod will move forwardly to completely close the throttle to the trailer engine.

7. An improvement in a tractor and trailer wherein said tractor and trailer are provided with a tractor engine and a trailer engine and a piped connection between the manifolds of the tractor engine and the trailer engine with a chamber disposed in said piped connection and having a movable member therein dividing the chamber into first and second compartments and having a rod extending rearwardly from said movable member and said trailer having fluid brakes and a fluid connection leading from the tractor to the brakes of the trailer and means operable by the brake pedal of the tractor for admitting fluid under pressure into the fluid pressure line leading to the brakes of the trailer and said trailer engine having a throttle arm, said improvement comprising a rod connected at one end to the throttle arm of the trailer engine and extending rearwardly and having a projection thereon provided with a bore in which the rod extending from the movable member in said chamber has sliding movement, a compression spring disposed on the rod extending from the movable member in said chamber and abutting against the projection on the rod connected to the throttle arm of the trailer engine, stop means on the rod connected to the movable member for engagement by said compression spring, spring means tending to move the throttle arm rearwardly at all times towards open position, a telescopic rod connected to the throttle arm rod, fluid operated means connected to the telescopic rod and a piped connection between the fluid operated means and the fluid pressure line whereby, fluid pressure in the tractor engine will control the position of the throttle arm to the trailer engine, and upon complete failure of the tractor engine, fluid pressure may be admitted to the fluid pressure line below the point at which brakes will be applied to the trailer brakes to thereby shorten said telescopic rod and move the throttle of the trailer engine toward closed position and upon a relaxation of pressure in the fluid pressure line, the spring means will tend to return the throttle of the trailer engine toward open position and upon admission of brake applying pressure to the fluid pressure line the telescopic rod will move forwardly to completely close the throttle to the trailer engine.

8. In a tractor and trailer wherein said tractor and trailer are provided with a tractor engine and a trailer engine and a piped connection between the manifolds of the tractor engine and the trailer engine with a chamber disposed in said piped connection and having a movable member therein dividing the chamber into first and second compartments and having a rod extending from said movable member and said trailer having fluid brakes and a fluid connection leading from the tractor to the brakes of the trailer and means operable by the brake pedal of the tractor for admitting fluid under pressure into the fluid pressure line leading to the brakes of the trailer and said trailer engine having a throttle arm, the combination of a rod connected at one end to the throttle arm of the trailer engine and extending rearwardly and having a projection thereon provided with a bore in which the rod extending from the movable member in said chamber has sliding movement, resilient means urging the two rods apart from each other, spring means tending to move the throttle arm rearwardly at all times towards open position, a telescopic rod connected to the throttle arm rod, fluid operated means connected to the telescopic rod and a piped connection between the fluid operated means and the fluid pressure line whereby, fluid pressure in the tractor engine will control the position of the throttle arm to the trailer engine, and upon complete failure of the tractor engine, fluid pressure may be admitted to the fluid pressure line below the point at which brakes will be applied to the trailer brakes to thereby shorten said telescopic rod and move the throttle of the trailer engine toward closed position and upon a relaxation of pressure in the fluid pressure line, the spring means will tend to return the throttle of the trailer engine toward open position and upon admission of brake applying pressure to the fluid pressure line the telescopic rod will move forwardly to completely close the throttle to the trailer engine.

9. An improvement in a tractor trailer combination wherein the tractor is provided with an engine and the trailer is provided with an engine and also provided with fluid actuated brakes and wherein there is a piped connection between the manifolds of the tractor and trailer engines and wherein there is provided a chamber with a movable dividing member disposed in the piped connection between the two manifolds, the piped connection extending from the tractor engine manifold being connected to one side of the chamber and the piped connection extending from the trailer engine manifold being connected to the other side of the chamber, said chamber having a movable member therein and a rod connected thereto and extending rearwardly and wherein there is provided a source of fluid pressure and a fluid pressure line leading to the brakes of the trailer, and wherein there is a connection between the brake applying means of the tractor and the fluid pressure source to permit the flow of fluid under pressure to the fluid pressure line leading to the brakes of the trailer, said improvement comprising a movable rod connected at one end to the throttle of the trailer engine and being slidably mounted on the rod extending from the movable member in said chamber, said rod extending from the movable member of said chamber slidably penetrating a portion of the throttle rod and having a stop thereon with spring means disposed between said stop and the projection on the throttle rod which is slidably penetrated by the rod extending from the movable member, spring means tending normally to move the throttle rod to open the throttle of the trailer engine, a telescopic rod connected to the throttle rod, and fluid pressure operated means connected to the fluid pressure line whereby, when full brakes are applied by the brake applying means of the tractor, the throttle of the trailer engine will be completely closed and, upon lesser pressure being admitted to the pressure line, the throttle of the trailer engine can be regulated at any desired point between fully open position and fully closed position.

10. An improvement in a tractor trailer combination wherein the tractor is provided with an engine and the trailer is provided with an engine and is also provided with fluid actuated brakes and wherein there is a piped connection between the manifolds of the tractor and trailer engines and wherein there is provided a chamber with a movable dividing member disposed in the piped connection between the two manifolds, the piped connection extending from the tractor engine manifold being connected to one side of the chamber and the piped connection extending from the trailer engine manifold being connected to the other side of the chamber, said chamber having a movable member therein and a rod connected thereto and extending rearwardly and wherein there is provided a source of fluid pressure and a fluid pressure line leading to the brakes of the trailer, and wherein there is a connection between the brake pedal of the tractor and the fluid pressure source to permit the flow of fluid under pressure to the fluid pressure line leading to the brakes of the trailer, said improvement comprising a movable rod connected at one end to the throttle of the trailer engine and being slidably mounted on the rod extending from the movable member in said chamber, said rod extending from the movable member of said chamber slidably penetrating a portion of the throttle rod and having a stop thereon with spring means disposed between said stop and the projection on the throttle rod which is slidably penetrated by the rod extending from the movable member, spring means tending normally to move the throttle rod to open the throttle of the trailer engine, a telescopic rod connected to the throttle, and fluid pressure operated means connected to the fluid pressure line whereby, when full brakes are applied by the pedal of the tractor, the throttle of the trailer engine will be completely closed and, upon lesser pressure being admitted to the pressure line, the throttle of the trailer engine can be regulated at any desired point between fully open position and fully closed position.

11. In a tractor trailer combination having a tractor engine and a trailer engine and a piped connection between the manifolds of the two engines and the throttle of the trailer engine whereby the manifold pressure of the tractor engine manifold controls the position of the throttle of the trailer engine, the trailer having wheels equipped with brakes and means on the tractor for applying the brakes, the combination of means activated by the brake applying means and connected to the throttle of the trailer engine for overriding the control exerted by the tractor engine manifold for moving the throttle of the trailer engine to idling position, means for biasing the throttle of the trailer engine to move towards fully opened position, and means for disconnecting the manifold of the tractor engine from the manifold of the trailer engine whereby the means for applying the brakes can be moved to less than brake applying position to partially close the throttle of the trailer engine.

12. In an automotive apparatus having the following conventional features: a fluid pressure system, a primary engine, a secondary engine, each engine being provided with an intake manifold and throttles for controlling the flow of fuel to the engines, means controlled by the manifold pressure in the primary engine for regulating the position of the throttle for the secondary engine, the automotive apparatus having fluid pressure actuated brakes and a fluid pressure line connected to the brakes and said apparatus having a brake pedal, a connection between the brake pedal and the fluid pressure system for admitting fluid pressure to the fluid pressure line upon application of brakes, the combination of a resilient and extensible means connected to the throttle lever of the secondary engine, tension means normally tending to move the throttle of the secondary engine to open position, a telescopic rod connected to the resilient and extensible means for controlling the position of the throttle of the secondary engine, fluid pressure operated means connected to said telescopic rod and to the fluid pressure line for closing the throttle to the secondary engine upon full application of brakes, and for holding the throttle of the secondary engine in a partially opened position by admission of less pressure into the fluid pressure line than that sufficient to apply the brakes.

ISAAC W. SIMPKINS.

REFERENCES CITED

The following references are of record in the file of this patent:

UNITED STATES PATENTS

| Number | Name | Date |
|---|---|---|
| 1,768,530 | Short | June 24, 1930 |
| 2,062,824 | Rockwell et al. | Dec. 1, 1936 |
| 2,140,109 | Kellar | Dec. 13, 1938 |
| 2,161,153 | Gallun et al. | June 6, 1939 |
| 2,235,175 | Simpkins et al. | Mar. 18, 1941 |
| 2,545,458 | Ginn | Mar. 20, 1951 |